(12) United States Patent
Marchal-George et al.

(10) Patent No.: US 6,423,664 B1
(45) Date of Patent: Jul. 23, 2002

(54) FLUORINATED CATALYST COMPRISING A GROUP VIII METAL AND AN ADDITIONAL METAL, AND ITS USE FOR HYDROGENATING AROMACTIC COMPOUNDS IN THE PRESENCE OF SULPHURATED COMPOUNDS

(75) Inventors: Nathalie Marchal-George, Saint Genis Laval; Slavik Kasztelan, Rueil-Malmaison, both of (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 09/708,530

(22) Filed: Nov. 9, 2000

(30) Foreign Application Priority Data

Nov. 10, 1999 (FR) .............................. 99 14141
Nov. 10, 1999 (FR) .............................. 99 14143
Nov. 10, 1999 (FR) .............................. 99 14140

(51) Int. Cl.[7] ...................... B01J 27/128; B01J 27/13; B01J 23/58; C07C 5/10; C07C 5/02

(52) U.S. Cl. ..................... 502/229; 502/230; 502/328; 502/330; 502/243; 502/245; 502/250; 502/252; 585/269; 585/270; 585/275; 585/277

(58) Field of Search .................... 502/229, 230, 502/328, 330, 243, 245, 250, 252; 585/270, 275, 277, 269

(56) References Cited

U.S. PATENT DOCUMENTS

| 3,943,053 A | | 3/1976 | Kovach ................... 208/143 |
| 4,061,592 A | * | 12/1977 | Bus ........................... 252/439 |
| 4,085,157 A | * | 4/1978 | Juguin et al. ............. 252/439 |
| 4,401,557 A | * | 8/1983 | Juguin et al. ............. 208/139 |
| 5,922,639 A | * | 7/1999 | Alario et al. ............. 502/230 |
| 6,218,334 B1 | * | 4/2001 | Alario et al. ............. 502/226 |

FOREIGN PATENT DOCUMENTS

| EP | 0 751 204 A1 | 1/1997 |
| FR | 2.006.803 | 1/1970 |
| FR | 1.596.032 | 7/1970 |
| FR | 2.223.337 | 10/1974 |
| FR | 2 695 648 | 3/1994 |

OTHER PUBLICATIONS

English Abstract of RU 2044031—(XP–002140861) Sep. 20, 1995.

* cited by examiner

*Primary Examiner*—Mark L. Bell
*Assistant Examiner*—Patricia L. Hailey
(74) *Attorney, Agent, or Firm*—Millen, White, Zelano & Branigan, P.C.

(57) ABSTRACT

The invention concerns a catalyst comprising at least one group VIII metal, at least one additional metal, at least two halogens, including chlorine and fluorine, and at least one amorphous oxide matrix. The catalytic composition is such that the fluorine content is 1.5% by weight or more of the total catalyst mass. The invention also concerns the use of this catalyst in hydrogenating aromatic compounds contained in feeds comprising sulphurated compounds.

24 Claims, No Drawings

FLUORINATED CATALYST COMPRISING A GROUP VIII METAL AND AN ADDITIONAL METAL, AND ITS USE FOR HYDROGENATING AROMACTIC COMPOUNDS IN THE PRESENCE OF SULPHURATED COMPOUNDS

FIELD OF THE INVENTION

The present invention relates to a supported catalyst based on a group VIII metal and an additional metal and comprising at least two halogens. The invention also relates to the use of this catalyst in a process for hydrotreating hydrocarbon-containing feeds containing small amounts of sulphur and in particular for hydrogenating aromatic compounds contained in such feeds.

Hydrotreatment processes are routinely used in operations for refining petroleum cuts to improve the characteristics of the finished products in terms of the specifications required to satisfy product quality and pollution requirements. Currently, gas oil cuts, whether from distillation or from a conversion process such as catalytic cracking, contain non negligible quantities of aromatic compounds, nitrogenated compounds and sulphurated compounds. The current legislation in the majority of industrialised countries requires that fuel for use in engines must contain less than 500 parts per million (ppm) of sulphur. In the very near future, this maximum quantity will be reduced to 350 ppm by 2000 then to 50 ppm for 2005 for the member states of the European community. Regarding the polyaromatic compound content in gas oils, this amount is in danger of being reduced to a very low level (of the order of 1% to 2%) from 2005. Thus hydrogenating the polyaromatics contained in gas oil cuts is becoming increasingly important because of the new sulphur and aromatic compound specifications for that type of fuel.

Desulphurisation is generally carried out under conditions and for catalysts that are not capable of simultaneously hydrogenating aromatic compounds. Thus a first treatment of the cut has to be carried out to reduce the sulphur content followed by a second treatment to hydrogenate the aromatic compounds contained in that cut. That second step is generally carried out by bringing the cut into contact with a catalyst generally based on a noble metal, in the presence of hydrogen. However, because the desulphurisation process can never completely eliminate the sulphurated and nitrogenated compounds, the catalysts used must be capable of operating in the presence of such compounds and as a result must have active phases with good thio-resistant properties.

The aim of the present invention is to provide a novel catalyst for desulphurising petroleum cuts and hydrogenating aromatics and polyaromatics present in those cuts.

PRIOR ART

Catalysts with thio-resistant properties which are known to the skilled person essentially include catalysts based on a noble group VIII metal or on a combination of such metals supported on an alumina type acid support (United States patent U.S. Pat. No. 3,943,053), silica alumina and zeolite (U.S. Pat. Nos. 4,960,505, 5,308,814 and 5,151,172). However, noble metals are extremely sensitive to the presence of sulphur that is a powerful inhibitor of the activity of noble metals. To avoid poisoning by the sulphur in the hydrogenating phase, it appears preferable that the metals are deposited on an acid support. Thus the use of a limited quantity of halogen such as chlorine or fluorine to increase the acidity of platinum/alumina type catalysts has been reported (J. P Frank, J. C. Marquis and M. Derrien, CR Acad. Sci. Paris, Series C, 1284 (1977), 297, and J. Cosyns, J. P. Frank and G Marin-Gil, CR Acad. Sci. Paris, Series C, t284 (1978) 85).

When using an alumina type support (U.S. Pat. No. 3,943,053), it has been reported that the quantities of metal have to be precisely controlled as well as the preparation conditions. This constraint causes obvious problems as regards flexibility when extrapolating such formulations to an industrial scale. The use of supports based on silica-alumina has also been reported. Examples which can be cited are U.S. Pat. Nos. 4,960,505, 5,308,814 and 5,151,172. Those different documents disclose that the type of zeolite for producing the desired properties is highly specific. Further, the use of such supports has some major disadvantages, including preparation, which includes a forming step requiring the use of mineral binders such as aluminas. The preparation methods must thus allow selective deposition of noble metals on the zeolitic material over deposition on the binder, which has an additional specificity linked to such a catalyst type.

Many patents describe metal catalysts comprising at least one halogen for use in processes for hydrogenating aromatic compounds. In particular, European patent application EP-A-0 751 204 describes a process for hydrogenating aromatic compounds with injection of chlorine into a catalyst based on a noble metal and containing at least 1% of a halogen to increase the hydrogenating activity of the catalyst.

U.S. Pat. No. 3,943,053 describes a method for hydrogenating aromatic compounds using a catalyst comprising two noble metals, namely platinum and palladium, and a quantity of chlorine in the range 1.2% to 2.5% by weight.

European patent application EP-A-0 955 090 describes a catalyst comprising two noble metals (Pt and Pd), fluorine and chlorine. The catalytic composition is such that the fluorine content is in the range 0.5% to 1.5% by weight and the chlorine content is in the range 0.3% to 2% by weight.

SIGNIFICANCE OF THE INVENTION

The Applicant has discovered that a catalyst used in hydrotreatment processes and in particular for hydrogenating aromatic compounds, comprising at least one metal from group VIII of the periodic table, at least one additional metal, at least two halogens, including chlorine and fluorine, and at least one amorphous oxide matrix, the catalytic composition being such that the quantity of fluorine represents at least 1.5% by weight of the total catalyst mass results in better performances as regards the degree of hydrogenation of the aromatic compounds than prior art catalysts comprising either a single metal or a small amount of halogen. The high degree of conversion of the aromatic compounds to the corresponding saturated compounds obtained with the catalysts of the invention is linked to the surprising synergistic effects of the combination of metals on the one hand and the combination of halogens present in higher quantities than in the prior art on the other hand. This high degree of hydrogenation results in very good resistance to sulphur for the catalyst, such that the activity of the catalyst is not affected by small residual amounts of sulphur in the teed to be treated.

The additional metal can be a metal from group IB of the periodic table, a metal from group IIB or a metal from group VIIB.

The catalyst of the present invention can advantageously be used to carry out hydrodesulphurisation and hydrogenation of aromatic compounds present in hydrocarbon feeds comprising sulphurated compounds. More particularly, the hydrocarbon feeds which can be treated using the catalyst of the invention are hydrocarbon feeds containing aromatic compounds, more particularly gas oil cuts from distilling crude oil and various processes for converting cuts known as cycle oils from catalytic cracking processes.

The invention also concerns the use of the catalyst in a process for hydrogenating aromatic compounds present in hydrocarbon cuts comprising sulphur. The sulphur content of feeds that can be treated using the process of the invention is less than 2000 ppm by weight, preferably 0.01 to 500 ppm by weight.

This catalyst may also be suitable for any process aimed at hydrogenating all or a portion of the aromatic compounds of a feed containing traces of sulphurated compounds, such as hydrogenating aromatic compounds in food oils and in solvents.

DESCRIPTION OF THE INVENTION

The catalyst of the invention contains at least one amorphous oxide matrix, at least one metal from group VIII of the periodic table, at least one additional metal and at least two halogens, including chlorine and fluorine.

The term "amorphous oxide matrix" as used below means a matrix with no elements that are catalytically active contained in its structure.

The catalyst of the invention is characterized in that the quantity of fluorine represents at least 1.5% by weight of the total mass of said catalyst.

In accordance with the invention, the additional metal is either a metal from group IB of the periodic table, or a metal from group IIB, or a metal from group VIIB.

Preferably, the catalyst of the present invention comprises, as a percentage by weight with respect to the total catalyst mass:

78% to 98.3% of at least one amorphous oxide material,
0.1% to 5% of at least one metal from group VIII of the periodic table, preferably selected from the group formed by palladium, rhodium, nickel and cobalt;
0.1% to 5% of at least one additional metal;
0.1% to 10% of chlorine;
at least 1.5%, preferably at most 20% of fluorine. Advantageously, the quantity of fluorine is in the range 1.8% to 15%, more preferably in the range 2% to 10% of fluorine.

Preferably, the group IB metal is gold or silver. The preferred group IIB metal is zinc. The preferred group VIIB metal is rhenium.

The amorphous oxide matrix used as a support is selected from transition aluminas, silicas and silica aluminas, and mixtures thereof This type of support has a specific surface area, determined by techniques that are known to the skilled person, in the range 100 to 600 $m^2/g$, preferably in the range 150 to 500 $m^2/g$ The amorphous oxide matrix can be used in the form of a powder or it can be pre-formed in the form of beads or extrudates.

The supported catalyst of the invention can be prepared using any of the methods that are well known to the skilled person.

Preferably, the catalyst is obtained by depositing the group VIII metal and the additional metal onto a support containing the amorphous oxide matrix, chlorine and fluorine. In a preferred mode for preparing the catalyst of the invention, the amorphous oxide matrix is first brought into contact with chlorine and fluorine before introducing the group VIII metal and the additional metal. More precisely, a fluorinated compound is first incorporated into the amorphous oxide matrix in a quantity such that the final catalytic composition contains at least 1.5% of fluorine by weight with respect to its total mass. The fluorinated support then obtained is brought into contact with a chlorinated compound to form a fluorinated and chlorinated support with a specific surface area in the range 100 to 500 $m^2/g$, preferably in the range 150 to 420 $m^2/g$.

The halogenated compounds are preferably added by means of an aqueous solution prepared from the corresponding mineral acids, for example hydrofluoric acid HF or hydrochloric acid HCl.

Fluorine can also be introduced in the form of hydrofluoric acid, ammonium fluoride, ammonium hydrogen fluoride or as an organofluorinated compound during forming of the amorphous oxide matrix. Decomposition of an organofluorinated compound and/or organochlorinated compound onto the catalyst is a method which may also be suitable for preparing the catalyst of the invention. This method is particularly advantageous in the case of fluorine as it can avoid the now restricted use of hydrofluoric acid solutions when preparing the catalyst. Examples of organochlorinated compounds are dichloromethane, trichloromethane, dichloroethane, trichloroethane, tetrachloroethylene, hexachloroethane and chloroform.

When the support is both chlorinated and fluorinated, the metals comprised in the catalyst can be introduced separately into the catalyst, using successive addition steps using solutions of one or more elements, or simultaneously, using a common solution of the elements. When a plurality of impregnating solutions are used to obtain the catalyst, drying or activation (calcining or reduction) steps can be carried out between two successive impregnation steps.

Group VIII metal precursors which can be used are conventional precursors which are well known to the skilled person. For the non noble metals, nitrates, sulphates, phosphates, halides, for example, chlorides, bromides and fluorides, carboxylates, for example acetates and carbonates, are advantageously used. Regarding the noble metals, nitrates are preferred when they exist, halides, for example chlorides, acids such as chloroplatinic acid or chloroiridic acid, alkali metal chlorometallates, chloro or hydroxoamminated complexes and oxychlorides such as ammoniacal ruthenium oxychloride. It is also possible to use coorindation complexes that are soluble in organic solvents such as acetylacetonate complexes. Carbonyl complexes can also be used.

The group IB metal precursors used are well known to the skilled person. Advantageously, water-soluble compounds are used such as silver nitrate and chloride and chloroauric acid.

The group IIB metal precursors used are well known to the skilled person. Advantageously, water-soluble compounds are used such as zinc nitrate and chloride.

The group VIIB metal precursors used are well known to the skilled person. Advantageously, water-soluble compounds are used such as ammonium perrhenate or manganese nitrate or chloride.

Catalyst preparation is generally ended by heating it in air (calcining). Before use, the catalyst is optionally reduced by passing a gas mixture containing hydrogen over the catalyst heated to a temperature generally in the range 50° C. to 600° C.

The catalyst of the invention can be used to treat hydrocarbon cuts. In particular, it can be used in a process for hydrogenating aromatic compounds present in feeds containing sulphurated compounds.

The feed which can be treated by the process using the catalyst of the invention has sulphur contents of less than 2000 ppm by weight, preferably 0.5 to 500 ppm by weight.

Further, depending on the sulphur content of the feed to be treated, it may be advantageous to pre-treat the feed, to reduce its sulphur content by conventional hydrotreatment processes.

The aromatic hydrogenation process of the invention is generally carried out at temperatures of 100° C. to 400° C., preferably 150° C. to 380° C. The operating pressure is generally 0.1 to 30 MPa, preferably 1 to 20 MPa. The space velocity (HSV), expressed as the volume of liquid feed treated per unit volume of catalyst per hour, is generally 0.1 to 20 $h^{-1}$. The hydrogen/feed ratio used, expressed as the volume of hydrogen measured under normal conditions per unit volume of liquid feed, is generally 50/1 to 2000/1.

A study of the results obtained by this hydrogenation process in the preferred implementations shows up a double synergistic effect, linked firstly to the association of at least two metal and then to the combination of at least two halogens, one of which is used in a large quantity.

The following examples illustrate the invention without limiting its scope.

EXAMPLE 1

Preparation of Alumina Support

We produced large quantities of an alumina-based support to be able to prepare the catalysts described below from the same formed support. To this end, we used a matrix composed of ultra fine tabular boehmite or alumina gel sold by Condea Chemie GmbH under the trade name SB3. This gel was mixed with an aqueous solution containing 66% nitric acid (7% by weight of acid per gram of dry gel) then mixed for 15 minutes. Following mixing, the paste obtained was passed through a die with cylindrical orifices with a diameter of 1.3 mm. The extrudates were then dried overnight at 120° C. and calcined at 550° C. for 2 hours in moist air containing 7.5% by volume of water. This produced cylindrical extrudates 1.2 mm in diameter with a specific surface area of 243 $m^2/g$, a pore volume of 0.61 $cm^3/g$ and a unimodal pore size distribution centred on 10 nm. Analysis of the matrix by X ray diffraction showed that it was composed solely of low crystallinity cubic gamma alumina.

EXAMPLE 2

Preparation of Halogenated Alumina Supports

A first halogenated alumina support with a low fluorine content was prepared from the S1 alumina support of Example 1. The method used consisted of introducing chlorine and fluorine successively by using an excess of solution. Support S1 was first treated with a 2% Cl HCl solution tor 30 minutes to obtain the desired quantity of chlorine on the support. After eliminating the solution a hydrofluoric acid solution was brought into contact with the chlorinated support for 1 h 30 minutes. The support was then rinsed and dried in dry air for 2 hours at 530° C. The support S2 obtained contained 0.65% by weight of chlorine and 0.62% by weight of fluorine. Its specific surface area was 218 $m^2/g$, with a pore volume of 0.59 $cm^3/g$.

A second halogenated support S3 was prepared in a different manner to introduce a sufficiently large amount of fluorine. To this end, we used a matrix composed of ultra fine tabular boehmite or alumina gel sold by Condea Chemie GmbH under the trade name SB3. This gel was mixed with an aqueous solution containing 66% nitric acid (7% by weight of acid per gram of dry gel) then mixed for 15 minutes using a Z arm mixer. Fluorine was then introduced in the form of ammonium fluoride to introduce 6.5% by weight of fluorine. After introducing the ammonium fluoride it was mixed again for 10 minutes. Following mixing, the paste obtained was passed through a die with cylindrical orifices with a diameter of 1.3 mm. The extrudates were then dried overnight at 120° C. and calcined at 550° C. for 2 hour in moist air containing 7.5% by volume of water. The support was then treated with a 2% Cl HCl solution for 30 minutes to deposit about 0.7% by weight of chlorine on the fluorinated support. Cylindrical extrudates 1.2 mm in diameter were obtained with a specific surface area of 214 $m^2/g$ and a pore volume of 0.63 $cm^3/g$, containing 0.71% of chlorine and 5.9% of fluorine. Analysis of the matrix by X ray diffraction showed that it was composed solely of low crystallinity cubic gamma alumina.

EXAMPLE 3

Preparation of Monometallic Catalysts (Not in Accordance with the Invention)

The preparation method used consisted of excess impregnation of the halogenated alumina extrudates of Example 2 (support S2 and S3) with a quantity of the salt of one of the metals selected from the group formed by palladium, rhodium, nickel, cobalt (group VIII of the periodic table), gold (group IB of the periodic table), zinc (group IIB of the periodic table) and rhenium (group VIIB of the periodic table) sufficient to deposit about 0.6% by weight of metal.

For palladium, the precursor was palladium bis-acetylacetonate dissolved in a volume of toluene equivalent to 5 times the pore volume of the support used. After 48 hours of exchange, the catalyst was rinsed, dried in air for 12 hours, then calcined for 2 hours at 350° C. in a stream of air.

For rhodium, the precursor was rhodium chloride dissolved in a volume of water equivalent to the pore volume of the support. After impregnating, the catalyst was dried in air for 12 hours then calcined for 2 hours at 350° C. in a stream of dry air.

For cobalt, the precursor was cobalt nitrate dissolved in a volume of water equivalent to the pore volume of the support. After impregnating, the catalyst was dried in air for 12 hours then calcined for 2 hours at 350° C. in a stream of dry air.

For nickel, the precursor was nickel nitrate dissolved in a volume of water equivalent to the pore volume of the support. After impregnating, the catalyst was dried in air for 12 hours then calcined for 2 hours at 350° C. in a stream of dry air.

For gold, the method used was the same as that described above, operating in the presence of chloroauric acid dissolved in a suitable volume of water.

For zinc, the precursor was zinc chloride dissolved in a volume of water equivalent to the pore volume of the support. After impregnating, the catalyst was dried in air for 12 hours at 130° C. then calcined for 2 hours at 350° C. in a stream of dry air.

For rhenium, the precursor was ammonium perrhenate dissolved in a volume of water equivalent to the pore volume of the support. After impregnating, the catalyst was dried in air for 12 hours at 130° C. then calcined for 2 hours at 400° C. in a stream of dry air.

The fluorine and metal contents of the catalysts obtained are shown in Table 1.

TABLE I

| Catalyst | Support | % F | % Cl | % metal |
|---|---|---|---|---|
| Ni | S2 | 0.58 | 0.45 | 0.58 |
| Pd | S2 | 0.57 | 0.58 | 0.57 |
| Rh | S2 | 0.54 | 0.81 | 0.54 |
| Co | S2 | 0.57 | 0.47 | 0.65 |
| Au | S2 | 0.51 | 0.48 | 0.44 |
| Zn | S2 | 0.63 | 0.76 | 0.37 |
| Re | S2 | 0.55 | 0.37 | 0.53 |
| Ni | S3 | 5.3 | 0.55 | 0.55 |
| Pd | S3 | 5.8 | 0.65 | 0.55 |
| Rh | S3 | 5.3 | 0.96 | 0.57 |
| Co | S3 | 5.4 | 0.44 | 0.56 |
| Au | S3 | 5.7 | 0.51 | 0.43 |
| Zn | S3 | 5.9 | 0.86 | 0.43 |
| Re | S3 | 5.6 | 0.43 | 0.57 |

EXAMPLE 4

Preparation of Bimetallic Catalysts

The method consisted of introducing an additional element into each of the catalysts of Example 3 containing a group VIII metal (Ni, Pd, Rh, Co). When the additional metal was a group IB metal, preferably gold, the gold was impregnated using chloroauric acid dissolved in a 2% Cl hydrochloric acid solution the volume of which was equivalent to the pore volume of the support so as to deposit about 0.5% by weight of gold.

After impregnation, the catalyst was dried in air for 12 hours at 130° C. then calcined for 2 hours at 400° C. in a stream of dry air.

When the additional metal was a group IIB metal, preferably zinc, the zinc was impregnated using zinc chloride dissolved in a 2% Cl hydrochloric acid solution the volume of which was equivalent to the pore volume of the support so as to deposit about 0.7% by weight of zinc. After impregnation, the catalyst was dried in air for 12 hours at 130° C. then calcined for 2 hours at 400° C. in a stream of dry air. This operation led to a substantial loss of Zn.

When the additional metal was a group VIIB metal, preferably rhenium, the rhenium was impregnated using ammonium perrhenate dissolved in a 2% Cl hydrochloric acid solution the volume of which was equivalent to the pore volume of the support so as to deposit about 0.6% by weight of rhenium. After impregnation, the catalyst was dried in air for 12 hours at 130° C. then calcined for 2 hours at 400° C. in a stream of dry air.

The fluorine, chlorine and metal contents of the catalysts obtained shown in Tables 2.1, 2.2 and 2.3.

TABLE 2.1

| Catalyst | Support | % F | % Cl | % group IB metal | % group VIII metal |
|---|---|---|---|---|---|
| NiAu | S2 | 0.55 | 1.12 | 0.43 | 0.54 |
| PdAu | S2 | 0.53 | 0.97 | 0.41 | 0.55 |
| RhAu | S2 | 0.52 | 1.1 | 0.42 | 0.52 |
| CoAu | S2 | 0.52 | 0.84 | 0.38 | 0.53 |
| NiAu | S3 | 5.4 | 0.93 | 0.43 | 0.49 |
| PdAu | S3 | 5.7 | 0.79 | 0.40 | 0.51 |
| RhAu | S3 | 5.7 | 0.85 | 0.45 | 0.50 |
| CoAu | S3 | 5.5 | 0.91 | 0.39 | 0.53 |

TABLE 2.2

| Catalyst | Support | % F | % Cl | % group IIB metal | % group VIII metal |
|---|---|---|---|---|---|
| NiZn | S2 | 0.50 | 0.72 | 0.32 | 0.55 |
| PdZn | S2 | 0.51 | 0.65 | 0.28 | 0.53 |
| RhZn | S2 | 0.55 | 0.73 | 0.34 | 0.51 |
| CoZn | S2 | 0.48 | 0.54 | 0.27 | 0.49 |
| NiZn | S3 | 5.4 | 0.75 | 0.29 | 0.51 |
| PdZn | S3 | 5.1 | 0.61 | 0.35 | 0.48 |
| RhZn | S3 | 5.4 | 0.68 | 0.28 | 0.46 |
| CoZn | S3 | 4.9 | 0.73 | 0.25 | 0.47 |

| Catalyst | Support | % F | % Cl | % group VIIB metal | % group VIII metal |
|---|---|---|---|---|---|
| NiRe | S2 | 0.61 | 0.99 | 0.53 | 0.57 |
| PdRe | S2 | 0.55 | 0.87 | 0.60 | 0.56 |
| RhRe | S2 | 0.52 | 0.93 | 0.65 | 0.51 |
| CoRe | S2 | 0.50 | 0.76 | 0.58 | 0.60 |
| NiRe | S3 | 5.0 | 1.02 | 0.56 | 0.53 |
| PdRe | S3 | 5.6 | 0.98 | 0.55 | 0.52 |
| RhRe | S3 | 5.0 | 0.86 | 0.52 | 0.53 |
| CoRe | S3 | 5.2 | 0.73 | 0.54 | 0.55 |

EXAMPLE 5

Hydrogenating Conversion for an LCO Type Feed

In this example, the catalysts obtained as described in the preceding examples were evaluated by means of a catalytic test under the following operating conditions:

total pressure: 60 bars feed: hydrotreated LCO;

reactor: in upflow mode

Before use, the Ni, Pd, Co, Rh catalysts supported on alumina underwent an activation step in a stream of hydrogen at 450° C. for 2 hours. The Au, NiAu, PdAu, CoAu, RhAu, Zn, NiZn, PdZn, CoZn, RhZn, Re, NiRe, PdRe, CoRe, RhRe catalysts underwent an activation step in a stream of hydrogen at 550° C. for 2 hours. This reduction could be carried out either in the catalytic test reactor (in situ conditions) or in an associated reduction cell (ex situ conditions).

Table 3 below shows the characteristics of the hydrotreated LCO type feed.

TABLE 3

| Characteristics | LCO feed |
|---|---|
| Density at 20° C. | 0.898 |
| Sulphur (ppm) | 128 |
| Nitrogen (ppm) | 110 |
| Distillation (° C.) | |
| Initial point | 171 |
| 10% by volume | 238 |
| 50% by volume | 301 |
| 90% by volume | 377 |
| end point | 405 |
| Aromatic compound composition (weight %) | |
| mono-aromatics | 37 |
| Di-aromatics | 15 |
| Tri-aromatics | 2 |
| Total | 54 |
| AC* (weight %) | 30 |

(*)AC = Aromatic carbon, measured by NMR.

The catalytic performances of the catalysts described in the preceding examples were then evaluated during a catalytic carried out under the following operating conditions:

total pressure 60 bars
HSV (space velocity) 1 l of liquid feed/l of catalyst/hour
Temperature 280° C.
H$_2$/feed ratio 450 Nl/l Table 4 below shows the aromatic conversion obtained with the monometallic and bimetallic to catalysts on support S2, not in accordance with the invention.

TABLE 4

|  | AC* effluent (weight %) | % ACDH** |
|---|---|---|
| Ni-S2 | 29.5 | 1.5 |
| Pd-S2 | 25 | 16.6 |
| Rh-S2 | 24 | 20.0 |
| Co-S2 | 29.9 | 0.3 |
| Au-S2 | 29.8 | 0.7 |
| Zn-52 | 30 | 0 |
| Re-S2 | 28 | 6.7 |
| NiAu-S2 | 28.8 | 4.0 |
| PdAu-S2 | 21 | 30.0 |
| RhAu-S2 | 20 | 33.3 |
| CoAu-S2 | 29.6 | 1.3 |
| NiZn-S2 | 29 | 3.3 |
| PdZn-S2 | 23 | 23.3 |
| RhZn-S2 | 23 | 23.3 |
| CoZn-S2 | 29.9 | 0.3 |
| NiRe-S2 | 26 | 13.3 |
| PdRe-S2 | 18.5 | 38.3 |
| RhRe-S2 | 17 | 43.3 |
| CoRe-S2 | 26.5 | 1.6 |

(*)AC = aromatic carbon, measured by NMR;
(**)ACDH = aromatic carbon degree of hydrogenation Table 4 shows that for a support with a small amount of fluorine (S2), associating a group VIII metal and an additional metal provides a substantial improvement in the hydrogenation activity of aromatics in the feed containing sulphur.

Subsequently, it was sought to determine whether this gain was increased when using a support with a large amount of fluorine (S3). Table 5 below indicates the aromatic compound conversion obtained with catalysts using support S3 containing a large amount of fluorine.

TABLE 5

|  | AC* effluent (weight %) | % ACDH** |
|---|---|---|
| Ni-S3 | 28 | 6.7 |
| Pd-S3 | 18 | 40.0 |
| Rh-S3 | 18.5 | 38.3 |
| Co-S3 | 29 | 3.3 |
| Au-S3 | 29.5 | 1.7 |
| Zn-S3 | 30 | 0 |
| Re-S3 | 22 | 26.6 |
| NiAu-S3 | 24 | 20.0 |
| PdAu-S3 | 16 | 46.7 |
| RhAu-S3 | 13 | 56.6 |
| CoAu-S3 | 26 | 13.3 |
| NiZn-S3 | 26 | 13.3 |
| PdZn-S3 | 17 | 43.3 |
| RhZn-S3 | 15 | 50.0 |
| CoZn-S3 | 28 | 6.6 |
| NiRe-S3 | 20 | 33.3 |
| PdRe-S3 | 14 | 53.3 |
| RhRe-S3 | 11 | 63.3 |
| CoRe-S3 | 15 | 50.0 |

(*)AC = aromatic carbon, measured by NMR;
(**)ACDH = aromatic carbon degree of hydrogenation Table 5 shows that associating the group VIII metal with an additional metal (IB, IIB, VIIB) is also beneficial when the metals are deposited on support S3 containing a large amount of fluorine, confirming the results of Table 4. Adding gold, zinc or rhenium to a catalyst comprising a group VIII metal results in a substantial improvement in the hydrogenation activity of aromatics in the feed containing sulphur. Comparing the results obtained for catalysts with a large amount of fluorine (Table 5) and catalysts with a low amount of fluorine (Table 4) shows the beneficial effect of a large amount of fluorine. This type of bimetallic catalyst on an oxide support containing chlorine and a large quantity of fluorine can thus enable feeds containing relatively large amounts of sulphur (128 ppm by weight in this example) to be treated with a high hydrogenation activity.

What is claimed is:

1. A catalyst comprising at least one amorphous oxide matrix, at least two halogens including chlorine and fluorine, at least one additional metal selected from the group consisting of groups IB, IIB and VIIB, and at least one metal from group VIII, wherein the quantity of fluorine represents at least 1.5% by weight of the total catalyst mass.

2. A catalyst according to claim 1, wherein the quantity of fluorine is at most 20% by weight of the total catalyst mass.

3. A catalyst according to claim 1 wherein the quantity of fluorine is in the range 1.8% to 15% by weight of the total catalyst mass.

4. A catalyst according to claim 1, wherein the quantity of fluorine is in the range 2% to 10% by weight of the total catalyst mass.

5. A catalyst according to claim 1 containing, with respect to the total mass, 78% to 98.3% of at least one amorphous oxide matrix, 0.1% to 5% of at least one additional metal, 0.1% to 5% of at least one group VIII metal, and 0.1% to 10% of chlorine.

6. A catalyst according to claim 1, wherein the group VIII metal is selected from the group consisting of palladium, rhodium, nickel and cobalt.

7. A catalyst according to claim 1, wherein the additional metal is a group IB metal.

8. A catalyst according to claim 7, wherein the group IB metal is gold or silver.

9. A catalyst according to claim 1, wherein the additional metal is a group IIB metal.

10. A catalyst according to claim 9, wherein the group IIB metal is zinc.

11. A catalyst according to claim 1, wherein the additional metal is a group VIIB metal.

12. A catalyst according to claim 11, wherein the group VIIB metal is rhenium.

13. A catalyst according to claim 1, wherein the amorphous oxide matrix is selected from alumina, silica and silica-alumina.

14. A process for preparing a catalyst according to claim 1, prepared by first contacting the amorphous oxide matrix with chlorine and fluorine, then introducing the group VIII metal and the additional metal.

15. A process for the treatment of hydrocarbon cuts, comprising contacting said hydrocarbon cut with a catalyst according to claim 1.

16. A process according to claim 15 for hydrogenating aromatic compounds present in hydrocarbon cuts comprising sulphur.

17. A process according to claim 15 carried out at temperatures of 100° C. to 400° C., at an operating pressure of 0.1 to 30 MPa, at a space velocity, expressed as the volume of liquid feed treated per unit volume of catalyst per hour, in the range 0.1 to 20, with a hydrogen/feed ratio of 50/1 to 2000/1 by volume of hydrogen per unit volume of liquid feed.

18. A catalyst according to claim 2, containing with respect to the total mass, 78% to 98.3% of at least one amorphous oxide matrix, 0.1% to 5% of at least one additional metal, 0.1% to 5% of at least one group VIII metal, and 0.1% to 10% of chlorine.

19. A catalyst according to claim 18, wherein the group VIII metal is selected from the group consisting of palladium, rhodium, nickel and cobalt.

20. A catalyst according to claim 19, wherein the additional metal is a group IB metal.

21. A catalyst according to claim 19, wherein the group IB metal is gold or silver.

22. A catalyst according to claim 19, wherein at least one additional metal is selected from the group consisting of gold, silver, zinc and rhenium.

23. A catalyst according to claim 1, prepared by a process comprising contacting the amorphous oxide matrix with chlorine and fluorine so as to introduce the chlorine and the fluorine into the oxide matrix, and thereafter introducing the group VIII and the additional metal into the oxide matrix.

24. A catalyst comprising at least one amorphous oxide matrix, at least two halogens including chlorine and fluorine, at least one additional metal selected from the group consisting of groups IB, IIB and VIIB, and at least one metal from group VIII, wherein the quantity of fluorine represents at least 5% by weight of the total catalyst mass.

* * * * *

UNITED STATES PATENT AND TRADEMARK OFFICE
CERTIFICATE OF CORRECTION

PATENT NO.     : 6,423,664 B1                                                    Page 1 of 1
DATED          : July 23, 2002
INVENTOR(S)    : Marchal-George et al.

It is certified that error appears in the above-identified patent and that said Letters Patent is hereby corrected as shown below:

<u>Title page, Item [54] and Column 1, line 4,</u>
Title, reads "AROMACTIC" should read -- AROMATIC --

Signed and Sealed this

Fifteenth Day of June, 2004

JON W. DUDAS
*Acting Director of the United States Patent and Trademark Office*